United States Patent
Shin et al.

(10) Patent No.: US 8,541,621 B2
(45) Date of Patent: Sep. 24, 2013

(54) POLYMERIZATION INITIATOR HAVING ARYL AZIDE AND SURFACE MODIFICATION METHOD OF CYCLIC OLEFIN COPOLYMER USING THE SAME

(75) Inventors: Dong-Ho Shin, Daejeon (KR); Insung S. Choi, Daejeon (KR); Sung Min Kang, Incheon (KR); Seung Pyo Jeong, Gwangju-si (KR); Jinkyu Kim, Seoul (KR); Bokyung Kong, Gimpo-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 789 days.

(21) Appl. No.: 12/556,546

(22) Filed: Sep. 9, 2009

(65) Prior Publication Data

US 2010/0143735 A1    Jun. 10, 2010

(30) Foreign Application Priority Data

Dec. 5, 2008  (KR) .................. 10-2008-0123239
Apr. 22, 2009  (KR) .................. 10-2009-0035119

(51) Int. Cl.
*C07C 235/34*  (2006.01)

(52) U.S. Cl.
USPC ........................................ 564/200

(58) Field of Classification Search
USPC ........................................ 564/200
See application file for complete search history.

(56) References Cited

U.S. PATENT DOCUMENTS

| | | | |
|---|---|---|---|
| 6,624,262 B2 | 9/2003 | Matyjaszewski et al. | |
| 7,150,815 B2 | 12/2006 | Ashmead et al. | |
| 2004/0028928 A1 | 2/2004 | Bennett et al. | |

FOREIGN PATENT DOCUMENTS

| | | |
|---|---|---|
| EP | 1731965 A2 | 12/2006 |
| JP | 04-090877 A | 3/1992 |
| JP | 04-348139 A | 12/1992 |
| JP | 05-310979 A | 11/1993 |
| JP | 2004-510847 A | 4/2004 |
| JP | 2006-028421 A | 2/2006 |
| JP | 2009-292911 A | 12/2009 |
| KR | 10-2006-0049922 A | 5/2006 |
| KR | 10-2008-0035811 A | 4/2008 |

OTHER PUBLICATIONS

Mecomber, Langmuir, 2008, 3645-3653, vol. 24, American Chemical Society.*
Justin S. Mecomber et al., "Photochemical Functionalization of Polymer Surfaces for Microfabricted Devices", Langmuir, 2008, pp. 3645-3653, vol. 24, American Chemical Society.
Bong Soo Lee et al., "Functionalization of Poly(oligo(ethylene glycol) methacrylate) Films on Gold and Si/SiO$_2$ for Immobilization of Proteins and Cells: SPR and QCM Studies", Biomacromolecules, 2007, pp. 3922-3929, vol. 8, American Chemical Society.
Bong Soo Lee et al., "Surface-Initiated, Atom Transfer Radical Polymerization of Oligo(ethylene glycol) Methyl Ether Methacrylate and Subsequent Click Chemistry for Bioconjugation", Biomacromolecules, 2007, pp. 744-749, vol. 8, American Chemical Society.
Justin S Mecomber et al., "Photochemical Functionalization of Polymer Surfaces for Microfabricated Devices", Langmuir, 2008, pp. 3645-3653, 24, American Chemical Society.
Qiaosheng Pu et al., "On-Chip Micropatterning of Plastic (Cylic Olefin Copolymer, COC) Microfluidic Channels for the Fabrication of Biomolecule Microarrays Using Photografting Methods", Langmuir, 2007, pp. 1577-1583, 23, American Chemical Society.

* cited by examiner

*Primary Examiner* — Yong Chu
*Assistant Examiner* — Sonya Wright

(57) ABSTRACT

Provided is a method for modifying a surface of a cyclic olefin copolymer, comprising: coating a compound of the following Chemical Formula 1 on the surface of a cyclic olefin copolymer substrate, irradiating UV light on the cyclic olefin copolymer substrate, and polymerizing a monomer on the cyclic olefin

[Chemical Formula 1]

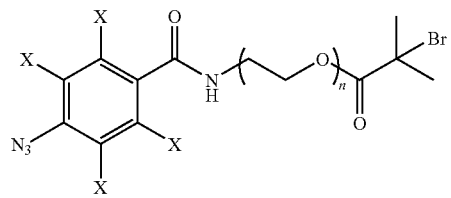

where X is H or F, and n is an integer of 1 to 6.

10 Claims, 7 Drawing Sheets

POLYMERIZATION INITIATOR HAVING ARYL AZIDE AND SURFACE MODIFICATION METHOD OF CYCLIC OLEFIN COPOLYMER USING THE SAME

CROSS-REFERENCE TO RELATED APPLICATIONS

This U.S. non-provisional patent application claims priority under 35 U.S.C. §119 of Korean Patent Application Nos. 10-2008-0123239, filed on Dec. 5, 2008 and 10-2009-0035119, filed on Apr. 22, 2009, the entire contents of which are hereby incorporated by reference.

BACKGROUND OF THE INVENTION

The present invention disclosed herein relates to a polymerization initiator having an aryl azide group and a surface modification method of a cyclic olefin copolymer using the same, and more particularly, to a photo-grafting method using a polymerization initiator having an aryl azide group and a method for modifying the surface of a cyclic olefin copolymer by a surface-initiated atom transfer radical polymerization.

Cyclic olefin copolymer is a kind of olefin copolymer in which a cyclic olefin is a part of a polymer backbone. Cyclic olefin copolymer has excellent optical transparency comparable to that of glass, resistance to polar solvents, electrical properties, and resistance to moisture. The glass transition temperature ($T_g$) of cyclic olefin copolymer is 70° C. to 180° C., and cyclic olefin copolymer produced under high glass transition temperature has a high elastic modulus.

Due to its physical properties as above, cyclic olefin copolymer may be applied to various technical fields. Cyclic olefin copolymer may be widely used in, for example, lens, capacity film, packaging material for food and drug, pharmaceutical box, reflector, and optical complex. It may be used as a packaging material due to its high resistance to moisture, and its friction sealing characteristics may be improved by adding a polyethylene monolayer. In the pharmaceutical field, cyclic olefin copolymer may be also used as a biochip due to its high resistance to polar solvents and moisture and excellent optical properties.

SUMMARY OF THE INVENTION

The present invention provides a polymerization initiator having an aryl azide group that may bond to the surface of a cyclic olefin copolymer, and a surface modification method of the cyclic olefin copolymer using the polymerization initiator.

The present invention also provides a surface-modified cyclic olefin copolymer substrate using the method.

Embodiments of the present invention provides polymerization initiator represented by the following Chemical Formula 1:

[Chemical Formula 1]

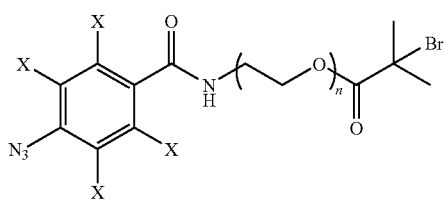

where X is H or F, and n is an integer of 1 to 6.

The embodiments of the present invention includes a method for modifying a surface of a cyclic olefin copolymer by using a polymerization initiator represented by Chemical Formula 1.

In other embodiments of the present invention, method for modifying a surface of a cyclic olefin copolymer includes coating a compound of Chemical Formula 1 on the surface of the cyclic olefin copolymer substrate, irradiating UV light on the substrate, and polymerizing a monomer on the cyclic olefin copolymer substrate.

In some embodiments, the compound represented by Chemical Formula 1 may be coated by spin coating.

In other embodiments, the UV light may have a wavelength of about 200 nm to about 300 nm and may be irradiated for about 5 to about 60 minutes. Preferably, the UV light has a wavelength of about 254 nm.

In still other embodiments, the cyclic olefin copolymer substrate may be treated with oxygen plasma before the compound of Chemical Formula 1 is coated on the cyclic olefin copolymer substrate. In addition, the cyclic olefin copolymer substrate may be washed before the oxygen plasma treatment, and the washing of the cyclic olefin copolymer substrate may be performed by applying ultrasonic wave.

In still other embodiments of the present invention, the polymerizing of the monomer includes performing an atom transfer radical polymerization with respect to monomers of the polymer by adding a transition metal catalyst. The transition metal catalyst may be a complex compound of copper, palladium, nickel, iron, and ruthenium. The monomer may be an acrylate, a methacrylate, and an acrylamide monomer.

In still other embodiments of the present invention, the acrylate monomer includes oligo(ethylene glycol)methacrylate or (3-(methacryloylamino)propyl)-dimethyl(3-sulfopropyl)ammonium hydroxide, and as a result, a cyclic olefin copolymer substrate on which a film of poly(oligo(ethylene glycol)methacrylate) or poly((3-(methacryloylamino)propyl)-dimethyl(3-sulfopropyl)ammonium hydroxide) is formed may be manufactured.

BRIEF DESCRIPTION OF THE FIGURES

The accompanying figures are included to provide a further understanding of the present invention, and are incorporated in and constitute a part of this specification. The drawings illustrate exemplary embodiments of the present invention and, together with the description, serve to explain principles of the present invention. In the figures.

DETAILED DESCRIPTION OF PREFERRED EMBODIMENTS

Figure 1:
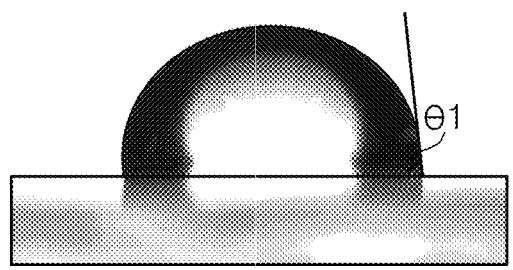
FIG. 1 is a photograph illustrating a contact between substrate surface and water without any treatment on the cyclic olefin copolymer substrate.

Preferred embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

In the present invention, a polymerization initiator is fixed on the surface of a cyclic olefin copolymer, and a polymerization is carried out on the surface of the cyclic olefin copolymer by means of the polymerization initiator to form a film on the surface of the cyclic olefin copolymer.

To fix a polymerization initiator on the surface of the cyclic olefin copolymer, a photo-grafting method using UV light is utilized. The polymerization initiator includes an aryl azide functional group to react with the cyclic olefin copolymer. In the photo-grafting, radicals of molecules are formed by being irradiated by UV light and the radicals of molecules formed are covalently bonded to the surface of the target material. Because the photo-grafting may be performed by irradiating light on some specific regions, patterning may be achieved, thereby allowing for surface adsorption in various forms.

When a polymerization initiator is fixed on the surface of the cyclic olefin copolymer, a polymeric film is formed on the surface of the cyclic olefin copolymer by a surface-initiated atom transfer radical polymerization.

The surface-initiated atom transfer radical polymerization is a reaction in which a polymerization initiator is first fixed on a substrate and then a polymerization is carried out by a polymerization initiator using a transition metal catalyst to form a polymeric film on the substrate.

A film formed by the method has a function to prevent a non-specific adsorption of bio-materials such as proteins and cells. The non-specific adsorption refers to adsorption on surfaces without any specific binding force. The film formed on the surface results in preventing the non-specific adsorption of the bio-material.

Hereinafter, surface modification of a cyclic olefin copolymer in accordance with exemplary embodiments of the present invention will be described in detail.

First, a polymerization initiator having an aryl azide functional group in accordance with an embodiment of the present invention will be described. The polymerization initiator has an aryl azide functional group. The polymerization initiator is expressed by the following Chemical Formula 1 and has a structure in which units of ethylene glycol are repeated,

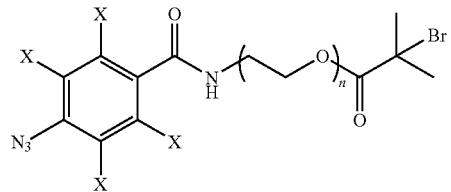

[Chemical Formula 1]

where X is H or F, and n is an integer of 1 to 6.

The aryl azide group then reacts with a cyclic olefin copolymer to form a bond. The ethylene glycol group is effective in preventing non-specific adsorption, and the intensity of non-specific adsorption prevention may be controlled by the number of repetitions. In addition, a bromine binds to a terminus of the polymerization initiator to facilitate formation of a radical when the subsequent separation of the bromine happens.

Examples of the polymerization initiator may be compounds having the structures of the following Chemical Formulas 2 and 3.

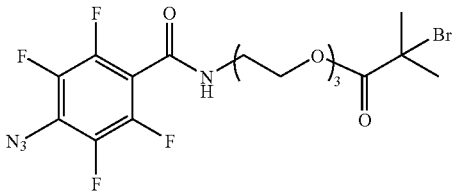

[Chemical Formula 2]

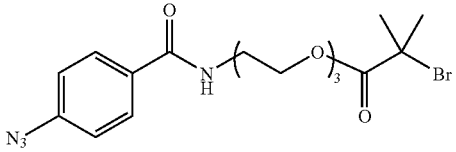

[Chemical Formula 3]

A surface modification method of a cyclic olefin copolymer by forming a film on the surface of the cyclic olefin copolymer using a polymerization initiator having an aryl azide group depicted in the above Chemical Formulae will be described in detail as follows.

First, a polymerization initiator of Chemical Formula 1 which has an aryl azide group is dissolved in a polar solvent.

The solvent is for the polymerization initiator dissolved into to be a solution, so that the solution has a suitable viscosity to be easily coated on the surface of the cyclic olefin copolymer. Solvents for dissolving the polymerization initiator having the aryl azide functional group are not specifically limited, and various solvents may be used, as long as they are easily able to dissolve the polymerization initiator and are easily removable in the subsequent steps. Preferably, water, methanol, or ethanol is used alone or in combination. The water, methanol, or ethanol may easily dissolve the polymerization initiator and accordingly it may be easily coated on the surface of a target material (on which the film is to be formed) and also easily dried and removed after spin coating.

The polymerization initiator may be dissolved at room temperature at a concentration of about 1%. The concentration is expressed as a weight to volume percentage corresponding to the ratio of the polymerization initiator (mg) to a solvent such as methanol (μL).

Then, a cyclic olefin copolymer substrate (which is a target material on which a film is to be formed) is prepared and washed. The cyclic olefin copolymer refers to an object in the form of a substrate, but is not limited to a substrate form, and the object may have various forms other than a substrate form, as long as it is manufactured from a cyclic olefin copolymer.

During the washing process, the substrate is first immersed in ethanol, and then ultrasonic waves are applied to the ethanol. The washing using ultrasonic wave is for removing contaminants which may be present on the surface. The washed substrate is then dried.

Subsequently, the dried cyclic olefin copolymer substrate is treated with oxygen plasma. The oxygen plasma treatment is for changing the surface properties of the cyclic olefin copolymer temporarily. Because a cyclic olefin copolymer substrate that is not treated with oxygen plasma mostly consists of carbon, the substrate has a substantially hydrophobic surface. To form a uniform film is difficult when a film is formed on a material having a hydrophobic surface, in particular, resulting in non-uniform film formed when a hydrophilic material is applied. This is due to surface energy difference resulting from a strong repulsive force at the interface.

Therefore, to coat a compound, in particular, a hydrophilic compound on a cyclic olefin copolymer substrate uniformly, the substrate surface needs to be made hydrophilic. The surface of the cyclic olefin copolymer substrate, when treated with oxygen plasma, is temporarily changed to have a hydroxyl group (—OH). Because the hydroxyl group is one of hydrophilic functional group, a certain level of hydrophilicity is imparted to the cyclic olefin copolymer substrate.

Next, the surface of the cyclic olefin copolymer subjected to plasma treatment is coated with a solution containing the polymerization initiator. Then, because carbons in the cyclic olefin copolymer substrate lose the hydroxyl group and return to their original state over time, the polymerization initiator is coated when the surface of the substrate is temporarily made hydrophilic after an oxygen plasma treatment. The solution containing the polymerization initiator is uniformly coated due to hydrophilicity of the substrate.

The polymerization initiator may be applied using various methods if it is uniformly applied throughout the substrate. For example, various methods such as spin coating, slit coating, roll coating, gravure printing, and the like may be used. The spin coating may preferably be used because the polymerization initiator may be coated in a simple process.

In addition, the polymerization initiator may be coated only on a predetermined region in which the surface is to be modified, if necessary. For example, the polymerization initiator may be applied only on a predetermined region, on which a film is to be subsequently formed, using gravure printing.

The solvent for the polymerization initiator is completely removed after coating, and only the polymerization initiator is left remaining on the surface of the substrate.

And then, UV light is irradiated on the cyclic olefin copolymer substrate coated with the polymerization initiator. UV light is irradiated to cause cross-linking between the aryl azide group and olefin copolymer main chain. The UV light may be irradiated only on a predetermined region in which the surface is to be modified if necessary, and in this case, a film may be formed in a pattern on the surface of the cyclic olefin copolymer.

A cross-linking reaction between the aryl azide group and the cyclic olefin copolymer main chain is represented by the following Chemical Formula 4. The following formula is expressed as a formula using a polymerization initiator of Chemical Formula 2 as one embodiment.

[Chemical Formula 4]

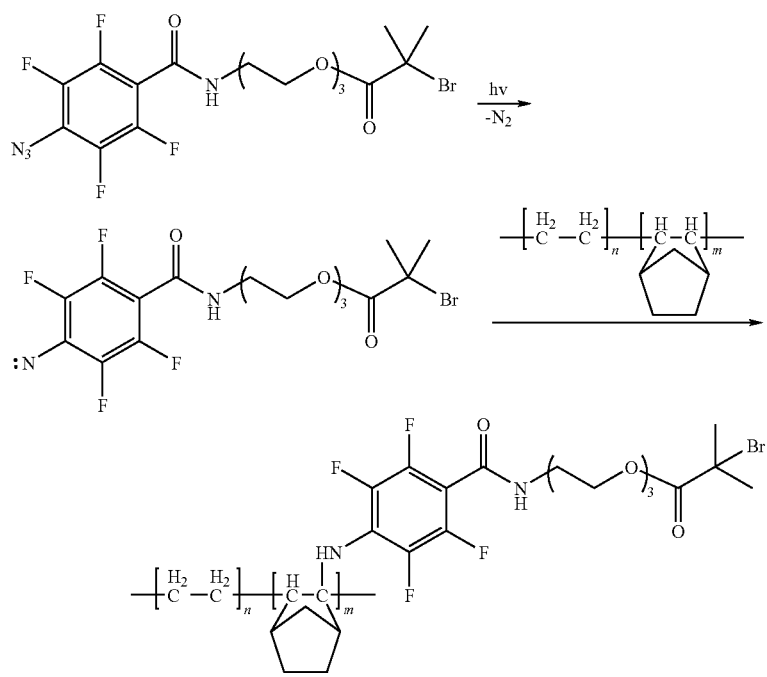

As observed in Chemical Formula 4, UV irradiation causes $N_2$ to be removed from —$N_3$ of the aryl azide group, and as a result, a radical is formed. The radical formed binds to the surface of the cyclic olefin copolymer. Thus, the polymerization initiator is fixed on the surface of the cyclic olefin copolymer through a reaction of aryl azide group.

UV light, of a wavelength range that is able to supply enough energy to cause cross-linking between the aryl azide and cyclic olefin copolymer main chain is, irradiated. The UV light using a wavelength at about 200 nm to about 300 nm may be irradiated for about 5 min to about 60 min. Preferably, UV light with a wavelength of about 254 nm may be used.

The polymerization initiator is fixed on the surface of the cyclic olefin copolymer, and then the surface of the cyclic olefin copolymer fixed with the polymerization initiator is immersed in a solution containing polymer monomers. Then, an atomic transfer radical polymerization is caused by means of a transition metal catalyst.

The mechanism of the atom transfer radical polymerization method is represented by Chemical Formula 5.

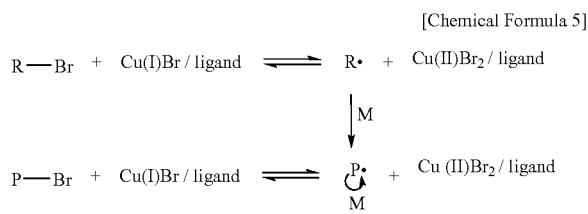

[Chemical Formula 5]

Then, Br is separated from the terminal group of the polymerization initiator to form a radical, the radical binds to another monomer (M). This reaction is continuously carried out, causing the surface of the cyclic olefin copolymer to be coated by a polymer (P) thereon.

As one embodiment in the polymerization, a copper complex compound may be used as a catalyst, and another kind of transition metal complex compound, for example, copper, palladium, nickel, iron, and ruthenium complex compounds, may be used as a catalyst.

Then, monomers for formation of a polymeric film, which may cause the atom transfer radical polymerization are not specifically limited, and acrylate, methacrylate, and acrylamide monomers may be used. For example, oligo(ethylene glycol)methacrylate or (3-(methacryloylamino)propyl)-dimethyl(3-sulfopropyl)ammonium hydroxide) may be used.

As a result of the atom transfer radical polymerization, a polymeric film is formed on the surface of the cyclic olefin copolymer. The cyclic olefin copolymer on which the film is formed is subsequently washed. Then, a washing liquid such as water, methanol, ethanol, isopropanol, and the like may be used alone or in combination.

Experimental Example 1

Figure 2:
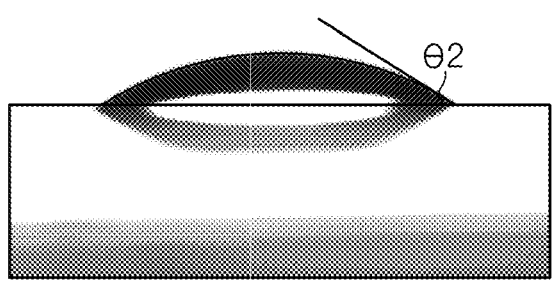
FIG. 2 is a photograph illustrating a contact between substrate surface and water after oxygen plasma treatment on the surface of the cyclic olefin copolymer substrate.
Figure 3:
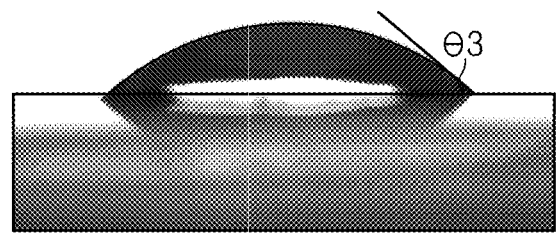
FIG. 3 is a photograph illustrating a contact between substrate surface and water after fixing the polymerization initiator on the plasma treated cyclic olefin copolymer substrate.

Contact angles to water in accordance with a surface state of the cyclic olefin copolymer substrate were photographed. FIG. 1 is a photograph illustrating a contact between substrate surface and water without any treatment on the cyclic olefin copolymer substrate, and FIG. 2 is a photograph illustrating a contact between substrate surface and water after oxygen plasma treatment on the surface of the cyclic olefin copolymer substrate. FIG. 3 is a photograph illustrating a contact between substrate surface and water after fixing the polymerization initiator on the plasma treated cyclic olefin copolymer substrate. Contact angle between the two materials can be measured in the way of measuring contact angles between substrate surface and water. After water drops were dripped on a substrate 10, and the contact angle θ, which was an angle between the interface of the substrate 10 and water drop 20, was measured. Measuring the contact angle between the two materials is used to identify degrees of hydrophilicity or hydrophobicity and is used widely in the study of surfaces because it can not only measure angles simply, but can also easily observe degrees of surface modification.

Referring to FIGS. 1 to 3, the changes of the contact angle between the water 20 and the substrate 10 shows the changes of surface properties of the cyclic olefin copolymer substrate.

Referring to the drawings, with a hydrophobic cyclic olefin copolymer substrate, a contact angle θ1 before surface treatment was about 110°, but a contact angle θ2 after oxygen plasma treatment was reduced to about 30°, and a contact angle θ3 after introduction of a polymerization initiator was changed to about 40°.

Because a highly hydrophobic surface was formed after oxygen plasma treatment, the contact angle was significantly reduced. After the coating of the polymerization initiator, a relatively hydrophobic surface rather than a hydrophilic surface was formed due to the effects of the initiator, and although the contact angle was a little increased, it was smaller than the angle of the substrate without any treatment.

The contact angle was significantly reduced after oxygen plasma treatment, which was due to the fact that the surface properties of the copolymer was changed during the plasma treatment, and the contact angle was slightly increased after introduction of the polymerization initiator, which was attributed to properties of the initiator.

Experimental Example 2

Whether the polymerization initiator was introduced on the surface of a cyclic olefin copolymer substrate was also able to be identified through an X-ray photoelectron spectroscopy.

Figure 4:
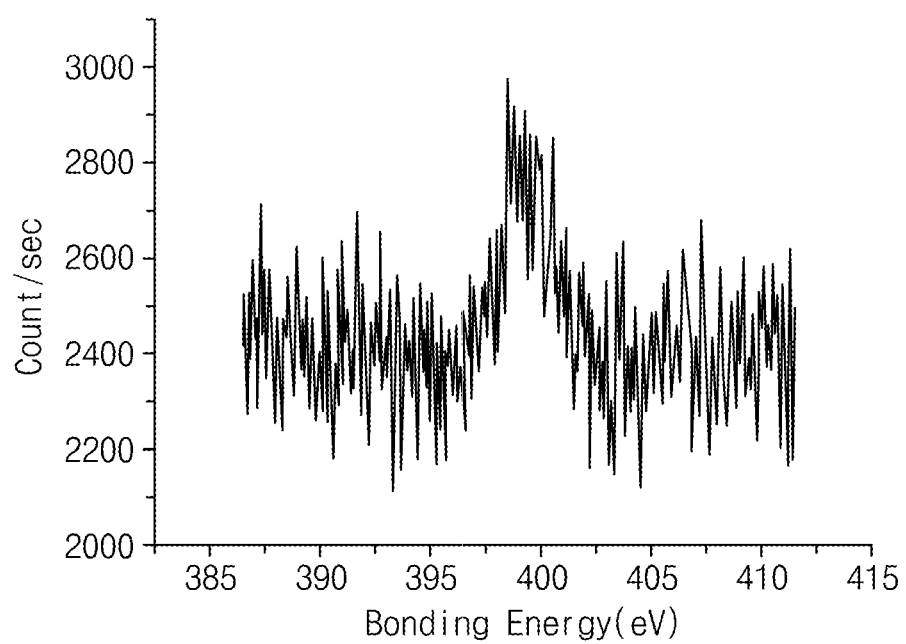
FIG. 4 is an X-ray photoelectron spectrum illustrating nitrogen peaks of a cyclic olefin copolymer fixed with a polymerization initiator having an aryl azide functional group.
Figure 5:
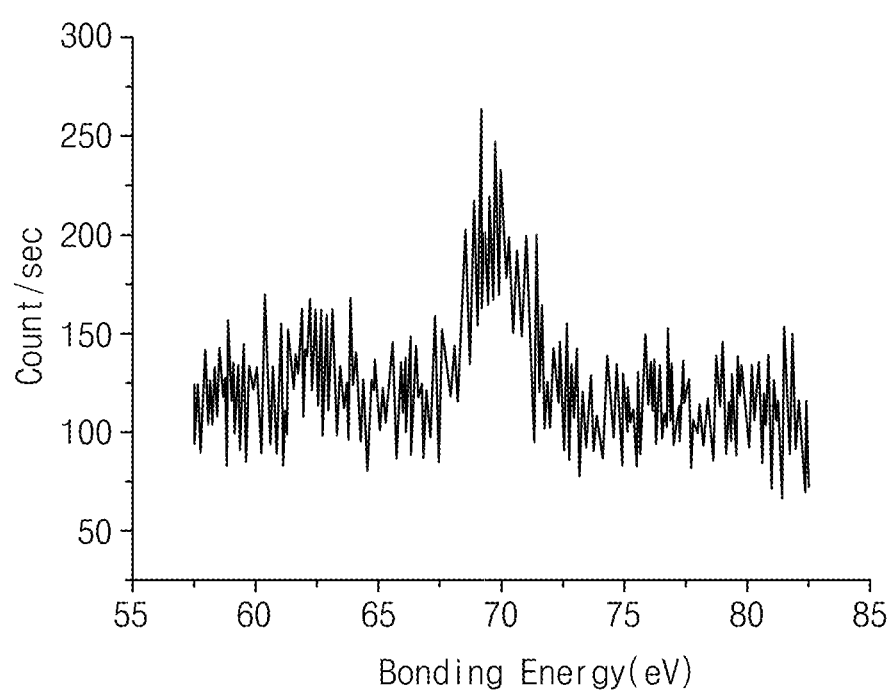
FIG. 5 is an X-ray photoelectron spectrum illustrating bromine peaks of a cyclic olefin copolymer fixed with a polymerization initiator having an aryl azide functional group.

As a result of an X-ray photoelectron spectroscopy of the cyclic olefin copolymer substrate in which the polymerization initiator was introduced, peaks of nitrogen and bromine which are elements present only in the polymerization initiator were observed at 399.1 eV and 69.8 eV, respectively. The results indicate that the polymerization initiator was well fixed on the copolymer substrate. X-ray photoelectron spectroscopy showing the nitrogen and bromine peaks are illustrated in FIGS. 4 and 5, respectively. FIG. 4 is an X-ray photoelectron spectrum illustrating nitrogen peaks of a cyclic olefin copolymer fixed and coated with a polymerization initiator having an aryl azide functional group, and FIG. 5 is an X-ray photoelectron spectrum illustrating bromine peaks of a cyclic olefin copolymer fixed and coated with a polymerization initiator having an aryl azide functional group.

Embodiment 1

A poly(oligo(ethylene glycol)methacrylate) film was formed on the surface of a cyclic olefin copolymer.

First, a cyclic olefin copolymer substrate was prepared.

Next, 143 mg of 1 mmol copper bromide Cu(I)Br and 312 mg of 2 mmol 2,2'-dipyridyl were placed in a polymerization container. Next, 5.39 ml of methanol, which was degassed under an argon atmosphere without oxygen, and 1.34 ml of deionized water, which was deionized twice, were injected. Subsequently, 3.27 ml of 10 mmol oligo(ethylene glycol) methacrylate (OEGMA, MW: ~360) was injected into the polymerization container. And the solution was stirred for about 5 to about 10 minutes. The concentration of the solution was controlled at a concentration of 1M.

The copolymer fixed with the polymerization initiator was placed in another polymerization container, the solution was injected and then was reacted at room temperature for about 3 hours such that the copolymer might be immersed in the solution. After the reaction was completed, the copolymer was washed with a washing agent. Methanol and distilled water were used as the washing agent. A polymeric film of poly(oligo(ethylene glycol)methacrylate) was formed on the surface of the copolymer.

Experimental Example 3

In Experimental Example 3, whether a poly(oligo(ethylene glycol)methacrylate) film was formed on the surface of the cyclic olefin copolymer in Embodiment 1 was determined using a infrared spectroscopy.

The infrared spectrum showed that C=O stretching and C—O stretching peaks appeared at 1740 $cm^{-1}$ and 1170 $cm^{-1}$, respectively. The C=O stretching and C—O stretching peaks are caused by bonding vibration energies of the polymerization initiator. After the polymerization was completed to form a polymer, the intensity of the C—O stretching peak, a bonding vibration energy between elements that the polymer characteristically has, was intensified at 1170 $cm^{-1}$. It was identified that from the appearance of these peaks and the change in intensity, the polymerization initiator was fixed and the polymeric film was formed.

Figure 6:
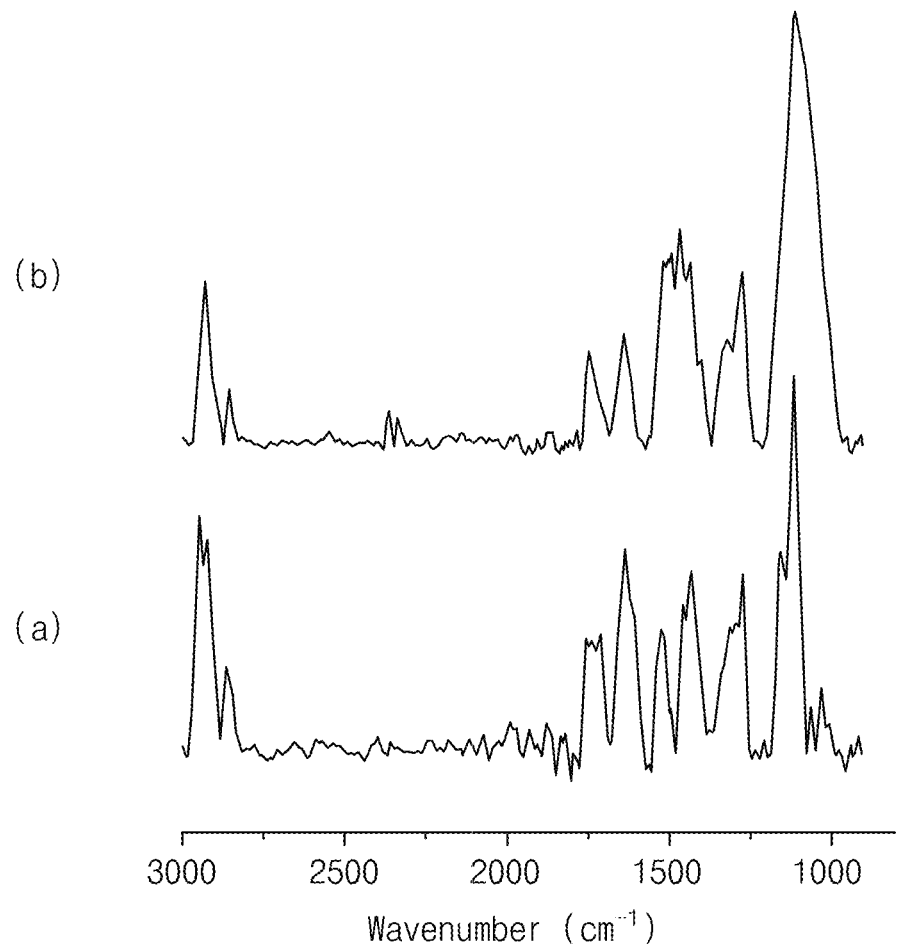
FIG. 6 is an infrared spectra illustrating the formation of a film of poly(oligo(ethylene glycol)methacrylate) on the surface of the cyclic olefin copolymer, (A) is an infrared spectrum of the cyclic olefin copolymer fixed with the polymerization initiator, and (B) is an infrared spectrum of the polymer formed.

FIG. 6 is an infrared spectra illustrating the formation of a film of poly(oligo(ethylene glycol)methacrylate) on the surface of the cyclic olefin copolymer, where (a) is a graph of infrared spectrum of the cyclic olefin copolymer fixed with the polymerization initiator, and (b) is a graph of infrared spectrum of the polymer formed.

Embodiment 2

A film of poly((3-(methacryloylamino)propyl)-dimethyl (3-sulfopropyl)ammonium hydroxide) was formed on the surface of the cyclic olefin copolymer.

2.5 g of 8.55 mmol (3-(methacryloylamino)propyl)-dimethyl(3-sulfopropyl)ammonium hydroxide, 0.0038 g of 0.017 mmol copper bromide Cu(II)Br, and 0.0667 g of 0.427 mmol 2,2'-dipyridyl were placed in a polymerization container. Then, 4 ml of distilled water and 1 ml of methanol were injected and the resulting mixture was subjected to a deoxygenation process for 4 hours.

After four hours of the deoxygenation process was carried out, and then 0.0245 g of 0.171 mmol copper bromide Cu(I)Br was placed to perform a deoxygenation process again for 10 minutes. The solution was injected until the cyclic olefin copolymer fixed with the polymerization initiator was immersed, and then the mixture was kept at room temperature for a predetermined time to carry out the reaction. After the reaction, the copolymer was washed with a washing agent. Water and methanol was used as the washing agent.

Experimental Example 4

In Experimental Example 4, it was identified by an infrared spectroscopy and an atomic force microscopy whether a film of poly((3-(methacryloylamino)propyl)-dimethyl(3-sulfopropyl)ammonium hydroxide) was formed on the surface of the cyclic olefin copolymer in Embodiment 2.

(1) Infrared Spectroscopic Analysis

It was identified by an infrared spectroscopy that a polymeric film of poly((3-(methacryloylamino)propyl)-dimethyl (3-sulfopropyl)ammonium hydroxide) was formed on the surface of the cyclic olefin copolymer. The results showed that C=O stretching, N—H bending, and S=O symmetric stretching peaks, bonding vibration energies between elements, which a film of poly((3-(methacryloylamino)propyl)-dimethyl(3-sulfopropyl)ammonium hydroxide) characteristically has, appeared at 1623 cm-1, 1570 cm-1, and 1220, respectively.

Figure 7:
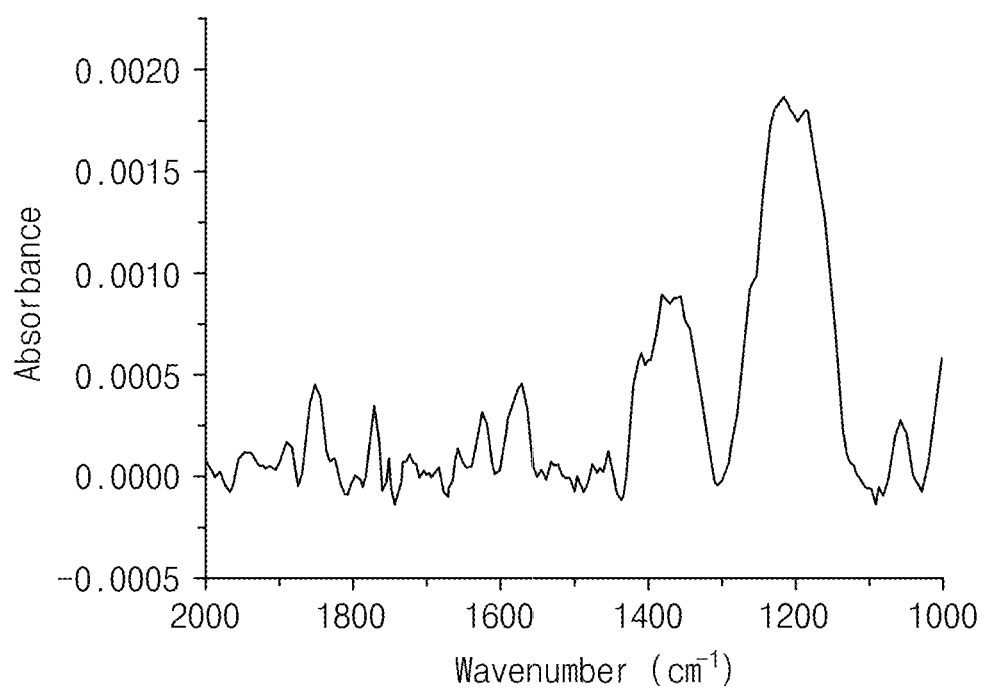
FIG. 7 is an infrared spectra of a film of poly((3-(methacryloylamino)propyl)-dimethyl(3-sulfopropyl)ammonium hydroxide) formed on the surface of the cyclic olefin copolymer.

FIG. 7 is an infrared spectrum of a film of poly((3-(methacryloylamino)propyl)-dimethyl(3-sulfopropyl)ammonium hydroxide) formed on the surface of the cyclic olefin copolymer.

(2) Atomic Force Microscopic Photography

An analysis of atomic force microscopic photographs indirectly showed that a polymeric film of poly((3-(methacryloylamino)propyl)-dimethyl(3-sulfopropyl)ammonium hydroxide) was formed on the surface of the cyclic olefin copolymer.

It may be indirectly shown by comparing atomic force microscopic photographs before and after the formation of the polymer that there was a change on the surface of the copolymer.

Figure 8:
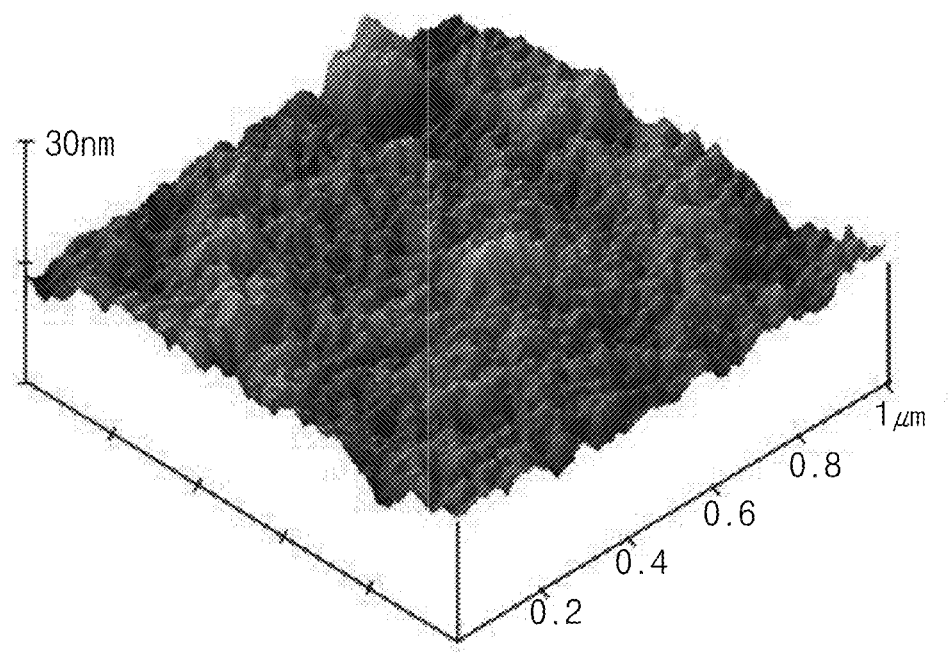
FIG. 8 is atomic force microscopic photographs of the surface of the cyclic olefin copolymer fixed with a polymerization initiator having an aryl azide functional group before polymeric film formation.
Figure 9:
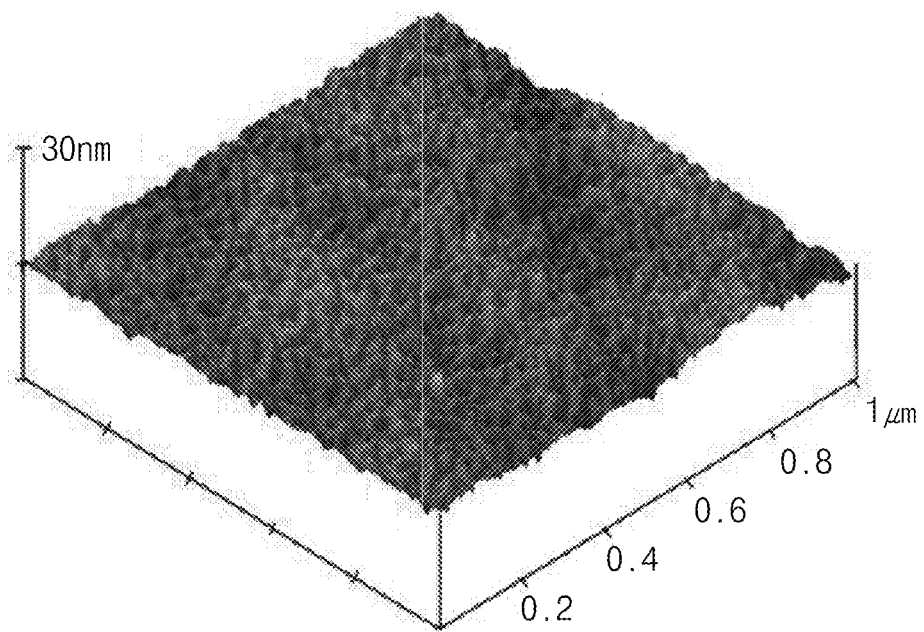
FIG. 9 is atomic force microscopic photographs of the surface of the cyclic olefin copolymer after the formation of a film of poly((3-(methacryloylamino)propyl)-dimethyl(3-sulfopropyl)ammonium hydroxide) on the surface of the cyclic olefin copolymer.

FIG. 8 is atomic force microscopic photographs of the surface of the cyclic olefin copolymer fixed with a polymerization initiator having an aryl azide functional group before the formation of a polymeric film. FIG. 9 is atomic force microscopic photographs of the surface of the cyclic olefin copolymer after the formation of a film of poly((3-(methacryloylamino)propyl)-dimethyl(3-sulfopropyl)ammonium hydroxide) on the surface of the cyclic olefin copolymer.

Referring to the drawings, it was observed that the surface was rough and seriously changed before the formation of the polymer but the surface of the copolymer became highly smooth after the formation of the polymer.

A polymerization initiator having an aryl azide group, with which a cyclic olefin copolymer may be reacted and bound, is provided to bind the polymerization initiator to the surface of the cyclic olefin copolymer. In addition, a method for modifying a surface of a cyclic olefin copolymer is provided by forming a polymeric film on the surface of the cyclic olefin copolymer using the polymerization initiator.

As described above, the surface of the cyclic olefin copolymer is modified to introduce other functional groups which the cyclic olefin copolymer does not have. Because the present invention can perform a patterning by using a photografting method during the surface modification process, a film can be formed only on some portions of the copolymer.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method for modifying a surface of a cyclic olefin copolymer, comprising:

coating a polymerization initiator represented by the following Chemical Formula 1 on the surface of the cyclic olefin copolymer;

irradiating UV light on the cyclic olefin copolymer; and polymerizing a monomer on the cyclic olefin copolymer,

[Chemical Formula 1]

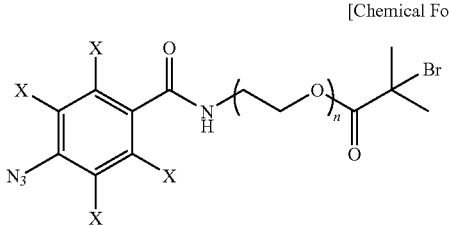

where X is H or F, and n is an integer of 1 to 6.

2. The method of claim 1, further comprising:
treating the cyclic olefin copolymer with oxygen plasma before coating the polymerization initiator on the cyclic olefin copolymer.

3. The method of claim 2, further comprising:
washing the cyclic olefin copolymer before the oxygen plasma treatment.

4. The method of claim 3, wherein the cyclic olefin copolymer is washed by applying ultrasonic waves to the cyclic olefin copolymer.

5. The method of claim 1, wherein the UV light is irradiated at a wavelength of about 200 nm to about 300 nm for about 5 to about 60 minutes.

6. The method of claim 1, wherein the polymerization initiator is coated on the surface of the cyclic olefin copolymer by spin coating.

7. The method of claim 1, wherein the polymerizing of the monomer comprises performing an atom transfer radical polymerization with respect to monomers of the polymer by adding a transition metal catalyst.

8. The method of claim 7, wherein the transition metal catalyst is a copper complex compound, a palladium complex compound, a nickel complex compound, an iron complex compound, or a ruthenium complex compound.

9. The method of claim 7, wherein the monomer is an acrylate monomer, a methacrylate monomer, or an acrylamide monomer.

10. The method of claim 9, wherein the acrylate monomer is oligo(ethylene glycol) methacrylate or (3-(methacryloylamino)propyl)-dimethyl(3-sulfopropyl)ammonium hydroxide.

* * * * *